United States Patent [19]

Kindig et al.

[11] 4,122,469

[45] Oct. 24, 1978

[54] PHOTOGRAPHIC APPARATUS WITH IMPROVED CONTROL OF CAMERA VIBRATION

[75] Inventors: Guilford Edwin Kindig; Chester William Michatek, both of Rochester, N.Y.

[73] Assignee: Eastman Kodak Company, Rochester, N.Y.

[21] Appl. No.: 780,148

[22] Filed: Mar. 22, 1977

[51] Int. Cl.² ............................................. G03B 17/50
[52] U.S. Cl. ....................................... 354/83; 354/212
[58] Field of Search ................... 354/212, 83, 86, 144, 354/172; 96/76 C

[56] References Cited

U.S. PATENT DOCUMENTS

| | | | |
|---|---|---|---|
| 3,232,196 | 2/1966 | Sapp, Jr. et al. | 354/172 |
| 3,369,468 | 2/1968 | Sapp, Jr. et al. | 354/144 |
| 3,753,392 | 8/1973 | Land | 354/86 |
| 3,767,404 | 10/1973 | Harvey | 96/76 C |
| 3,771,426 | 11/1973 | Harvey | 354/86 |
| 3,965,480 | 6/1976 | Elorata | 354/83 |
| 3,967,304 | 6/1976 | Johnson et al. | 354/83 |
| 3,984,851 | 10/1976 | Goto | 354/212 |
| 3,994,006 | 11/1976 | Ichii | 354/212 |

*Primary Examiner*—Richard A. Wintercorn
*Attorney, Agent, or Firm*—N. Rushefsky

[57] ABSTRACT

A photographic apparatus particularly suitable for the exposure and initiation of processing of a self-processing film unit includes a movable shuttle that is adapted to engage the film unit and advance the exposed film unit at least partially from its exposure position. A spring biases the shuttle towards a retracted position wherein a film engaging portion thereof is disposed to engage the film unit in its exposure position. After advancement of a foremost film unit from the exposure position a restraint supports the shuttle in an advanced position against the bias of the spring. The shuttle is releasable from the restraint in response to movement of a body release from an initial position to initiate exposure of the next succeeding film unit. The improved apparatus of the invention provides means responsive to movement of the body release means from its initial position for releasing the shuttle from the restraining means and for permitting the shuttle to translate only part of the distance towards its retracted position under the bias of the spring means and to translate the remainder of the distance towards its retracted position when the body release means returns to its initial position. In allowing the shuttle to translate the remainder of the distance to its retracted position only after the body release is allowed to return towards its initial position any shock or vibration created by the shuttle when reaching the retracted position will likely occur at a time subsequent to termination of the exposure of the film unit.

9 Claims, 8 Drawing Figures

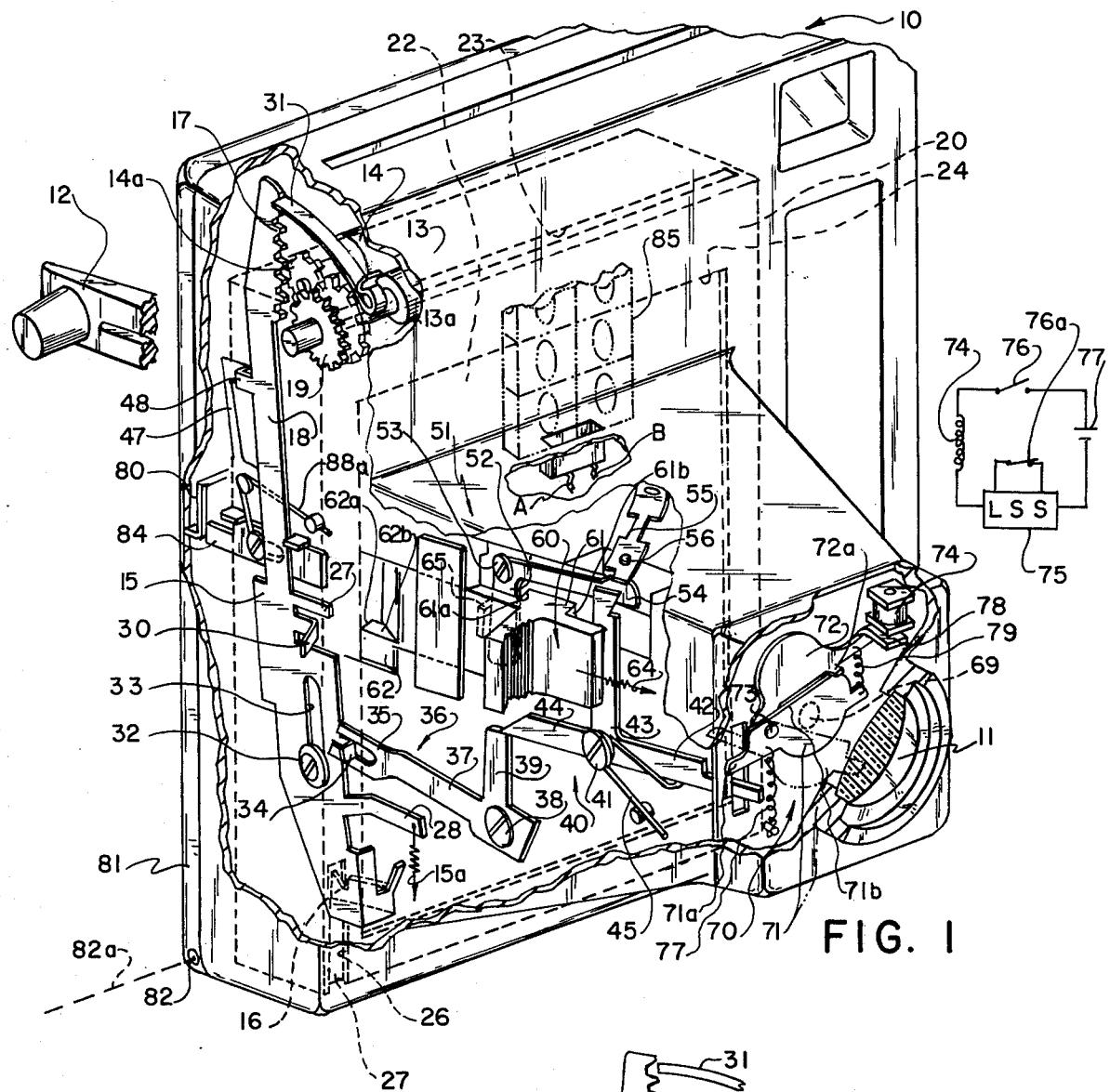
FIG. 1
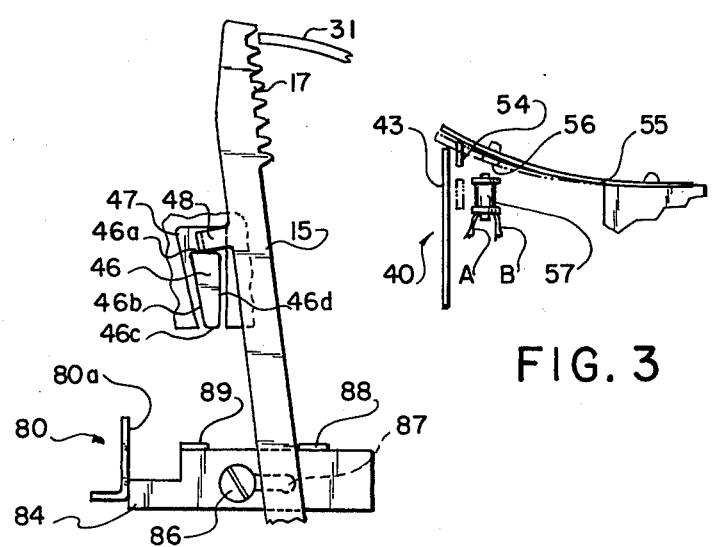
FIG. 2
FIG. 3

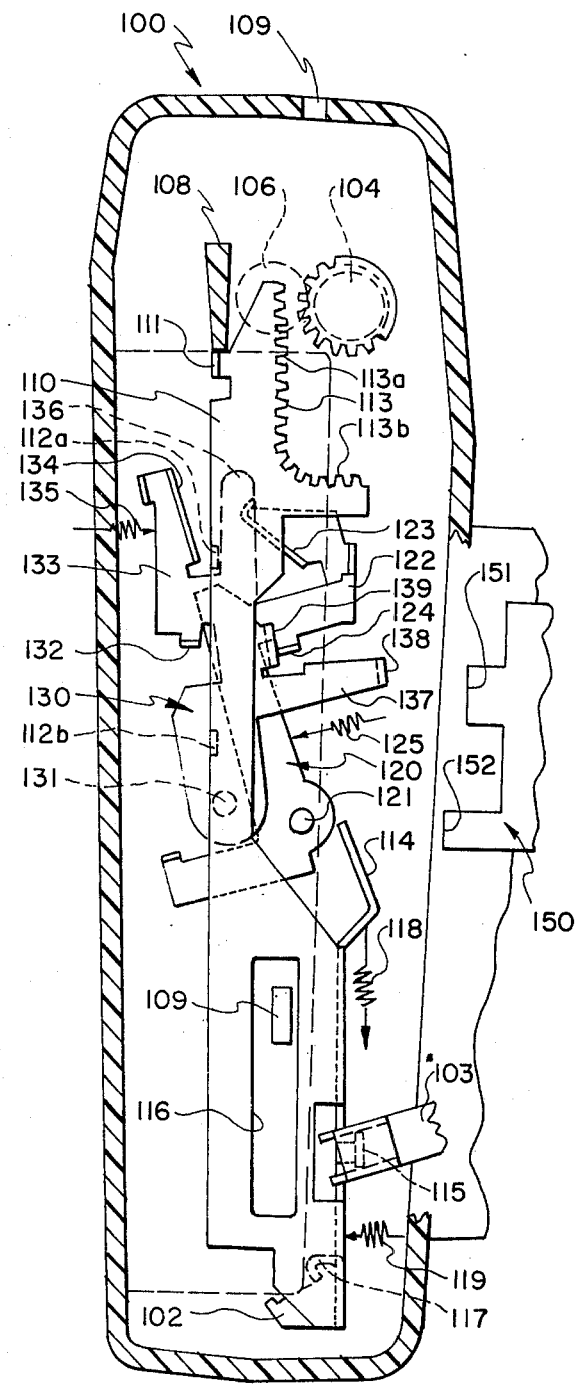
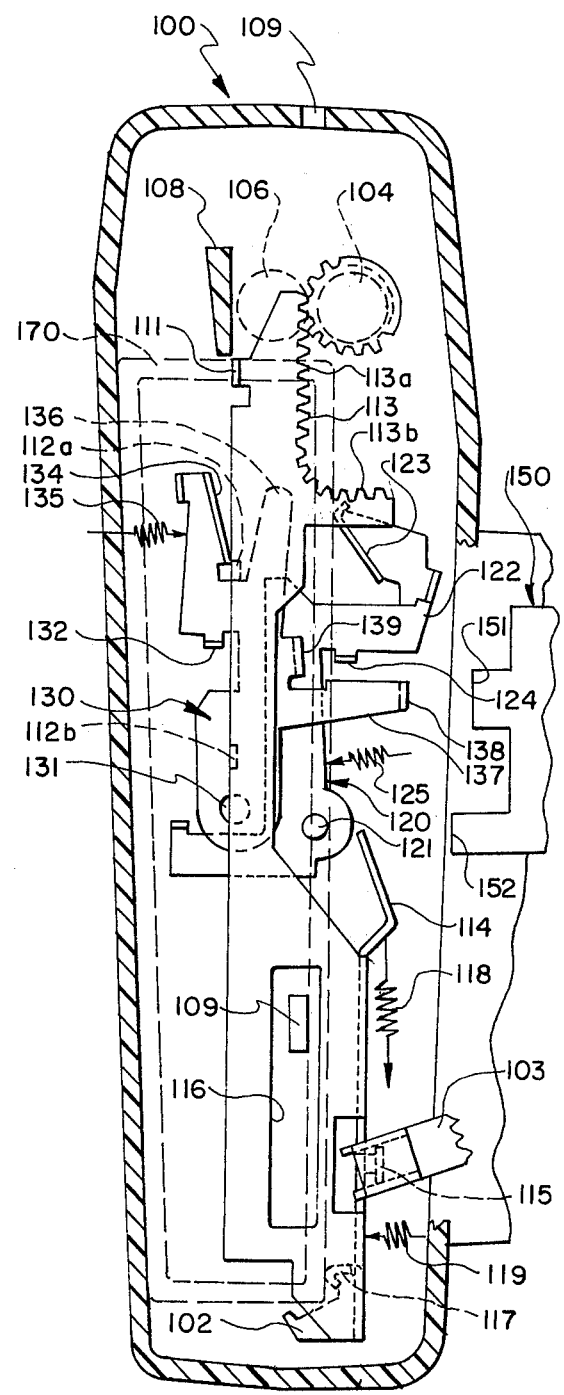
FIG. 5a
FIG. 5b

PHOTOGRAPHIC APPARATUS WITH IMPROVED CONTROL OF CAMERA VIBRATION

CROSS-REFERENCE TO RELATED APPLICATION

Reference is made to commonly assigned U.S. application Ser. No. 780,149, filed concurrently herewith in the name of Donald M. Harvey and entitled Improved Photographic Apparatus For Use With Self-Processing Film Units.

BACKGROUND OF THE INVENTION

1. Field of the Invention

The invention pertains to novel photographic apparatus for use with film units of the self-developing type. More particularly the invention pertains to an improved apparatus for the exposure and the initiation of processing of such film units and which apparatus includes improved means for control of vibration.

2. Description of the Prior Art

Photographic apparatus for use with film units of the self-developing type are generally provided with a chamber for supporting a cartridge containing a plurality of film units with a foremost one thereof being locatable in proper position for exposure. After exposure of the foremost film unit a shuttle is actuated to advance the exposed film unit into a pressure applyig means to rupture a pod of chemical activator solution incorporated within the film unit and to uniformly spread the chemical solution over the image forming areas of the film. In the past various means have been proposed for synchronizing the several camera functions such as exposure and film unit transport so that these functions are performable in only the desired sequence thereby precluding anomalous operations by those perhaps unfamiliar with the operation of the camera. One approach which provides a relatively simple apparatus is described in the aforementioned Harvey application. The embodiments described in the Harvey application include a pivotable and translatable shuttle that is urged by a relatively strong spring towards a first position in which position the film engaging portion of the shuttle is located adjacent a trailing edge of a foremost film unit. Upon application of the camera's drive, movement is imparted to the shuttle to move the film engaging portion thereof into a slot formed within the cartridge and thereafter against the aforesaid trailing edge. The shuttle is then moved sufficiently to introduce the leading edge of the foremost film unit into the pressure applying means. After having performed this function, means are provided for restraining return movement of the shuttle under the influence of the now energized spring. The energized shuttle is used to actute the apparatus' shutter in response to movement of a body release member for exposure of the next succeeding film unit. Upon movement of the body release the restraint is removed and the shuttle is allowed to gain momentum until it reaches its terminal position as defined by a slot formed in the shuttle and a pin secured to the frame of the camera and/or by the unstressed point of the spring. This movement of the shuttle is so rapid that it is capable of reaching its terminal position at a time when the shutter may still be open and being utilized in the exposure of a film unit. The shuttle is not stopped instantaneously when attaining its terminal position but instead vibrates for a very small period of time before stopping completely. Since these vibrations and the initial shock in stopping the shuttle are transmitted to some extent to the remainder of the camera it is possible that they may have an adverse effect upon image sharpness particularly on those exposures produced with exposure times of reasonably extended durations.

SUMMARY OF THE INVENTION

The prior art as exemplified by the Harvey application has recognized that a relatively simple self-processing camera having advantages belying its simplicity may be provided with the combination of elements recited above. In its broadest aspects, the invention described herein teaches that in the context of this prior art certain modifications to elements associated with the body release and the shuttle can provide a quite meaningful and unexpected improvement.

It is therefore an object of the invention to provide a relatively simple photographic apparatus for the exposure and processing of film units of the self-developing type and which includes improved means for reducing disturbance of the apparatus during exposure of a film unit.

The above and other objects which will become apparent after a review of the description of the preferred embodiment of the invention are realized by providing photographic apparatus for effecting exposure and initiating processing of a self-processing film unit of the type referred to herein wherein there are provided exposure means and film unit transport means for at least partially advancing the film unit from its exposure position. The transport means includes a shuttle having a film unit engaging portion that is spring-biased towards a retracted position wherein the film unit engaging portion is disposed to engage the film unit in its exposure position. After advancing the film unit partially from the exposure position the shuttle is caught by a restraining means and held in an advanced position against the bias of the spring. The shuttle is released and allowed to move towards its retracted position in response to movement of the body release from an initial rest position. To reduce the aforementioned problems associated with apparatus disturbance, the apparatus further includes operative means responsive to movement of the body release means from the initial position for releasing the shuttle from the restraining means and for permitting the shuttle to translate only a minor portion of the full distance between the advanced and retracted positions while the body release means is maintained during exposure of the film unit in a position removed from its initial position. Upon return movement of the body release to its initial position, the operative means cooperates with the shuttle to permit the shuttle to again translate towards its retracted position.

BRIEF DESCRIPTION OF THE DRAWINGS

FIG. 1 is a perspective view of a photographic apparatus comprising one embodiment of the invention.

FIG. 2 is a fragmented side elevation view of a portion of the apparatus shown in FIG. 1.

FIG. 3 is a schematic representing a front elevation view of a portion of the apparatus of FIG. 1.

DESCRIPTION OF THE PREFERRED EMBODIMENTS

Figure 4:
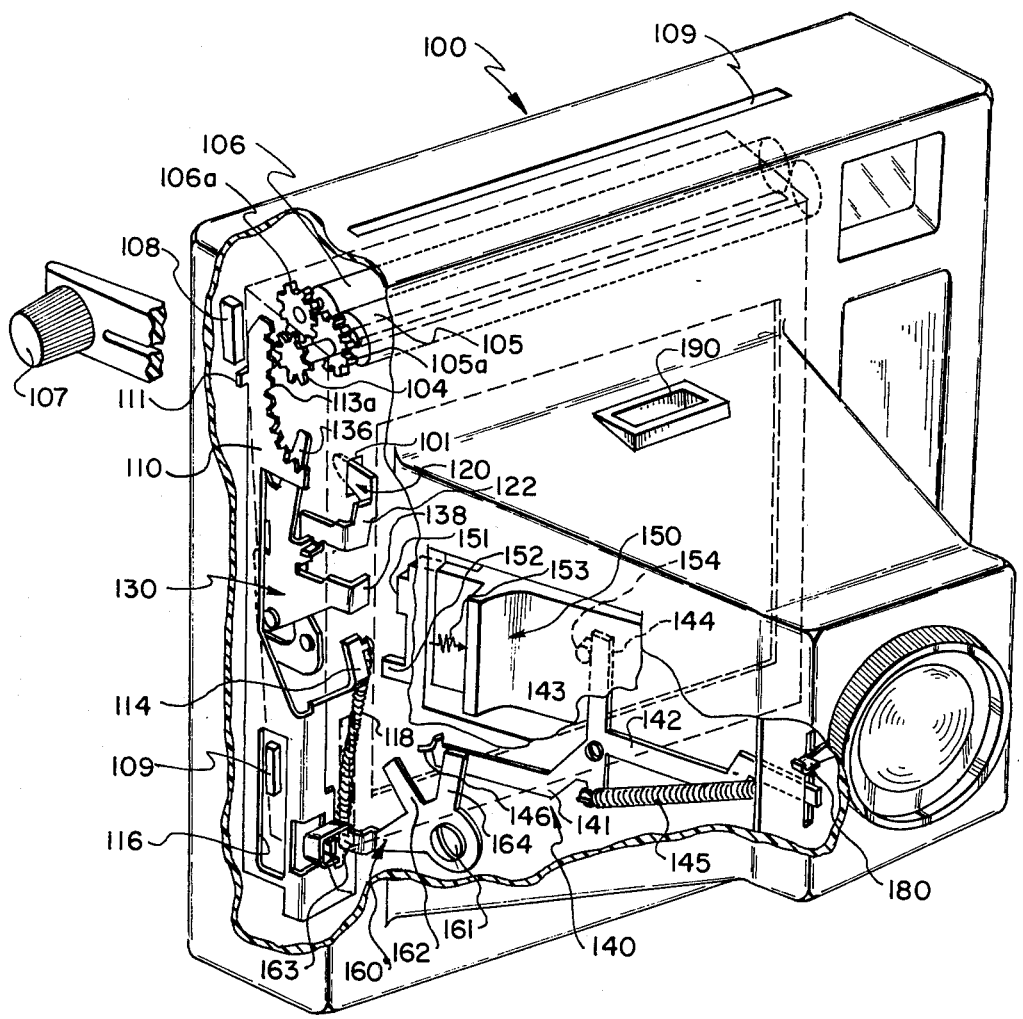
FIG. 4 is a perspective view of a photographic apparatus comprising another embodiment of the invention.

Because photographic cameras for film units of the self-processing type are well known, the present description will be directed in particular to elements forming part of or cooperating more directly with the present invention. Camera and film elements not specifically shown or described herein are selectable from those known in the prior art.

With reference now to FIG. 1 there is shown a camera 10 of the kind suitable for receiving and exposing of self-processing film units. The camera 10 includes a lens 11 and a chamber for supporting a cartridge 20 containing a plurality of self-processing film units. The cartridge 20 may be similar to those that are known and may include in addition to the film units a dark slide to protect the film units from light prior to introduction of the cartridge into the camera. The cartridge further includes an aperture 24 through which a foremost film unit 22 supported in the cartridge may be exposed by the camera. A narrow slot 23 provided in one end of the cartridge permits an exposed film unit to exit therethrough for movement into the camera's pressure applying means which may take the form of opposed pressure rollers 13, 14. The mechanism for movement of the film unit into the pressure applying means comprises an elongated shuttle 15 having a film-engaging picker 16 formed adjacent one end thereof. The picker is adapted to be moved into a narrow opening 26 provided therefor in the cartridge, which opening provides access to the picker of a trailing edge 27 of the foremost film unit.

Located adjacent the opposite end of the shuttle in the direction towards the leading edge of the foremost film unit 22 is a gear rack 17 which is formed on a longitudinal edge 18 of the shuttle and is adapted to engage or cooperate with a spur gear 19. Gear 19 is supported concentrically with roller 13 and keyed with roller 13 so that the roller will be driven when rotational drive is imparted to gear 19. Also mounted concentrically with gear 19 is a second gear 13a which is in mesh with and adapted to drive a similar gear 14a mounted for rotation with roller 14. The source of drive to gear 19 may consist of a hand crank 12 as shown or alternatively a suitable motor. In order to provide sufficient pressure to a film unit that is being moved through the rollers, it is desirable to mount the rollers 13, 14 so that a spring or some other means urges the two rollers towards one another to form a nip. Roller 14 may be mounted for rotational movement about its axis as well as for limited translational movement away from roller 13, against the bias of the spring, in response to movement of a film unit between the rollers. Roller 13 may be a fixed roller and mounted for rotation only.

The shuttle 15 is secured to a spring 15a which couples the shuttle to the camera frame and which biases the shuttle so that the film engaging portion thereof is located adjacent the trailing edge 27 of the foremost film unit 22. Additionally, the shuttle is mounted for pivotal and translational movement by a pin 32 that is rigidly attached to the frame of the camera and which is further located in a longitudinally extending slot 33 formed in the shuttle. As used herein the term, translational movement, refers to uniform motion of a body in a straight line. Intermediate the rack and the picker the shuttle also includes an L-shaped finger 34 which is located within a fork-like end 35 of one arm 37 of a latch 36. The latch is pivotably mounted to the mechanism plate or frame of the camera by a pin 38 and has a second arm 39 that cooperates with a shutter opening lever 40. The location of the finger 34 within the fork-like end 35 of lever arm 37 provides a pivotal and slidable connection between the shuttle and the latch.

Shutter opening lever 40 comprises a member that is pivotably supported to the frame of the camera by a pin 41 and includes three arms, 42, 43 and 44. An end of arm 42 is adapted to contact shutter 70 in a manner that will be described below. An end of arm 43 is operatively associated with appropriate means for effecting the creation of artificial illumination to provide additional light for the exposure of the object being photographed. Further description relative to the operation of the flash system will also be described below. With the positions of the elements as shown in FIG. 1 an end of the third arm 44 is forced against arm 39 of latch 36 by a torsion spring 45 which biases the shutter opening lever for pivoting movement about pin 41 in the counterclockwise direction. It will be appreciated that in this position the latch 36 is operating to preclude opening of the shutter.

With reference now to the shuttle 15, the shuttle's movement is limited not only by the pin but by a slot formed on the frame of the camera and defined by an island 46 and a land 47 which less than completely surrounds the island in spaced relationship therefrom. An L-shaped tab 48 on the shuttle is locatable within this slot and when in the slot the movement of the shuttle will thereby be constrained to follow the path defined by the slot.

The operation of the unique combination of elements comprising one preferred embodiment of the invention and further description of such elements will now be made. The camera shown in FIGS. 1 and 2 has the elements thereof located in a cocked position occuring prior to initiation of an exposure of a foremost film unit 22. Upon sliding movement of a body release member 60 rearwardly from the initial position shown and towards the shuttle 15 a rearwardly facing land 61a on a projection 61 of body release will move an arm 52 of a hammer cocking lever 51 and pivot this lever clockwise about pin 53, which connects the lever to the frame of the camera. The clockwise pivoting of this lever 51 drops a second arm 54 thereof below the uppermost extension of arm 43 of the shutter opening lever 40. This allows a flat spring-like beam 55 which is cantileveredly supported to the camera's frame and which includes a hammer 56 to descend at its free end so that it is supported in an energized condition by the uppermost extension of arm 43 as shown in phantom in FIG. 3. It will be noted that after sufficient rearward displacement of the body release member the arm 54 will pivot to a position in which it will not block hammer 56 from striking piezoelectric cyrstal 57. Such striking however, will not occur until latch arm 43 is pivoted away from engagement with the free end of beam 55.

With further rearward movement of the body release member 60 a second rearwardly facing land 62a on a rearwardly projecting member 62 of the body release contacts an L-shaped tab 30 on shuttle 15 and thereby pivots the shuttle in a counterclockwise direction about pin 32. With reference to both FIG. 1 and FIG. 2 it will be noted that tab 48 of the shuttle is located within the slot defined by island 46 and land 47. In this position the tab 48 is at rest on the top edge 46a of the island and this edge supports the shuttle against the bias of now energized strong spring 15a. Pivoting of the shuttle results in the tab being released from the restraint imposed by the top edge 46a of the island and the shuttle rapidly descends, under the bias of spring 15a, with the tab 48 guided by island side edge 46b. After descending a distance equal to a minor portion of the length of island side edge 46b a finger 27 on the shuttle located immediately above L-shaped tab 30 engages an upwardly facing land 62b on body release member 62. The engagement of the finger 27 with land 62b blocks the shuttle from further downward movement while the body release member remains in its rearwardmost position. As indicated previously the purpose of the rearward displacement of the body release member is to initiate exposure of the foremost film unit 22. This occurs by virtue of the described partial descent of the shuttle from the top edge 46a of island 46. In the process of descending, the shuttle tab 34 pivots latch 36 counterclockwise to remove arm 39 from engagement with arm 44 of the shutter opening lever 40. The shutter opening lever is thereby free to pivot counterclockwise under the bias of a strong torsion spring 45. The pivoting of the shutter opening lever forces the arm 42 thereof into engagement with an arm 71a of a shutter opening blade 71 and thereby pivots this blade clockwise about a mounting pin 73 to uncover a circular aperture 69 formed in a plate (not shown) upon which the shutter is mounted. The aperture is located so that the center thereof lies along the optical axis of the lens 11. The lens may be supported by appropriate conventional means in front of the aperture and shutter. The shutter 70, the specific details of which form no part of my invention, may further include an electromagnetic coil 74, a shutter closing blade 72 and suitable conventional electronic controls for example, a light sensitive switch 75. The initial depression of the body release member 60 just prior to release of the shuttle results in a switch 76 being closed to complete an electrical circuit between a battery 77, the coil 74, and the light sensitive switch 76. The coil, thus energized, attracts a tab 78 fixed to the shutter closing blade 72. With further depression of the body release button, as described above, the shuttle is released from its restraint and in response thereto the shutter opening blade 71 is pivoted by arm 42, against the bias of spring 77, about the mounting pin 73 into the open position shown in phantom. A spring 79 which is mounted with each end thereof secured to respective tabs located on each of the shutter blades is energized by the opening movement of the shutter opening blade while the shutter closing blade remains stationary because of the restraint imposed by the energized coil 74. As the shutter blades overlie the aperture 69, light will be admitted from the lens through the aperture to expose film unit 22 only when the shutter blades are in the "shutter open" position just described. When the shutter opening blade 71 uncovers the aperture 69 normally closed switch 76a associated with the LSS 75 opens to commence integration of light by the LSS 75. After an appropriate exposure time as determined by the LSS 75, the coil will be de-energized and the shutter closing blade will pivot, under the bias of spring 79, about its supporting pin 73 towards the shutter opening blade. This pivoting movement will move the closing blade over the aperture and the exposure of the film unit 22 will be over.

The release of the latch 36 from engagement with the shutter opening lever arm 44 has in addition to opening of the shutter and commencement of the exposure of film unit also removed the end of arm 43 from engagement with the energized flat spring-like beam 55 which includes the hammer 56. The release of the beam causes the impacting of the hammer upon the piezoelectric crystal 57. The impact upon the crystal produces an electrical potential across the leads A and B which may be used to provide artificial illumination upon a subject to provide proper exposure of the film unit 22. The means for providing such illumination will be described with reference to flash producing devices known in the art as "flip-flash" arrays however those skilled in the art will appreciate that other suitable flash devices may also be used. The flip-flash array 85 (shown in phantom) includes a plurality of bulb-containing compartments each of which is adapted to provide a flash of light. Suitable controls are provided so that only one bulb is "fire" at the time of exposure of one film unit. The bulbs each include a chemical primer that is responsive to a high level electrical voltage pulse from the camera. It is generally known that the source of the pulse may comprise a piezoelectric crystal and an energized hammer located in the camera to strike the crystal concurrently or approximately concurrently with the opening of the shutter. The electrical potential generated by the crystal is delivered by the leads A, B to a socket which supports the flip-flash array on the camera when it is desired to provide artificial illumination.

After exposure of the film unit 22 the operator may release the body release member 60. Upon release, the body release member returns forwardly under the bias of a relatively strong spring 64 to its initial position shown. The land 62b no longer blocks the shuttle finger 27 and the shuttle descends completely and is oriented in a position wherein the film engaging picker is disposed in proximate position for engagement with the trailing edge 27 of film unit 22. The complete descent of the shuttle implies that the L-shaped tab 48 falls below the bottom edge 46c of island 46. Spring 15a is mounted to shuttle tab 28 and thereby provides a force tending to bias the shuttle downwardly and in a clockwise direction about pin 32 and into an orientation suitable for picker operation. An important consideration in the descent of the shuttle along island edge 46b is that the picker is pivoted forwardly so as to minimize contact with the foremost film unit 22. This will ensure that the shuttle will not jam against the film unit 22. During return of the body release member to its initial position a forwardly facing land 61b on the projection 61 engages arm 43 of the shutter opening lever and pivots the lever clockwise against the bias of torsion spring 45. Arm 42 is thus pivoted from engagement with arm 71a and the shutter opening blade is free to pivot under the bias of spring 77 to its initial position. The shutter closing blade through engagement of blade edge 71b with tab 72a will also move to its original position. During such movement the aperture will be covered by either or both of the blades. The hammer cocking lever 51 is also caused to pivot but in a counterclockwise direction, through engagement of a forwardly facing land 65 on the body release with arm 52 to cock beam 55 as shown in FIGS. 1 and 3.

The shuttle spring 15a, in addition to biasing the shuttle towards the trailing edge of the film unit, also biases the shuttle for pivotal movement favoring engagement of the rack 17 with gear 19. The release of the body release button by the operator allows the rack to pivot into engagement with gear 19. The exposed film unit 22 is removed from the cartridge and introduced into the roller nip by clockwise rotation of the hand crank by the operator. Turning of the crank in this manner moves the picker firstly into engagement with a portion of the trailing edge 27 of film unit 22 that is located within the slot 26 of the cartridge. Thereafter the picker element and film unit move toward the pressure rollers.

After reaching its upwardmost position, a cantilevered spring 31 engages the rack and pivots the shuttle counterclockwise about the pivot pin 32, so that the rack is removed from engagement with the spur gear 19. The L-shaped tab 48 is thereby located on the top edge 46a of island 46 and supports the shuttle in an inactive but energized condition against the bias of shuttle spring 15a in readiness for the next exposure.

With reference now to FIGS. 1 and 2 the description will now be directed to a means for removing a safety cover from the cartridge. As indicated previously this safety cover is present on conventional cartridges of the kind described herein and is provided to permit day light loading of a cartridge into the camea. Since a flip-flash array may be present on the camera when a new cartridge is introduced into the camera, the need for actuation of the body release to return the picker to a retracted position for removal of the safety cover may not be desirable since one bulb of the array will be fired unless the array is removed from the camera before actuating the body release. The camera may include as an advantageous feature means associated with a cartridge loading door for releasing the shuttle from its island-like restraint. One means suitable for this purpose comprises a latch member 8 that is slidably mounted to the cartridge access door 81. The access door is pivotably mounted to the frame of the camera by hinge 82 located at the bottom rear edge of the camera so that it may be pivoted about hinge axis 82a from an open position in which a cartridge may be inserted into the camera to a closed position in which the door closes the camera and urges the cartridge into engagement with appropriate conventional cartridge locating surfaces (not shown). The latch member 80 is movable into a suitably configured structure formed in the frame of the camera to latch the door 81. From the aforementioned figures it will be noted that a front face 80a of latch 80 bears against one end of a slide 84 that is mounted to the camera frame by a pin 86 which extends through a slot 87 formed in the slide. Two tabs 88 and 89 are formed on the slide and the shuttle is mounted so that it extends between the two tabs. When the operator wishes to insert a new cartridge into the camera the rear door may be opened by sliding an externally located handle of the latch in a direction identifiable as being into the plane of FIG. 2. Movement of the latch from engagement with the slide allows the door to be pivoted about the axis 82a. In addition a torsion spring 88a has one arm thereof in engagement with tab 89 to bias the slide rearwardly. When the latch is moved to the open position the slide is no longer blocked and the slide will move rearwardly causing tab 88 to engage the shuttle and pivot the shuttle off the island 46, whereupon the shuttle will descend completely into its retracted position for removal of a safety cover from the new cartridge that has been inserted into the camera. The operator, after insertion of the new cartridge, latches the door by moving the latch to the position shown in FIGS. 1 and 2 whereupon the wedge-like leading end of the latch moves the slide 84 forwardly into the positin shown in FIGS. 1 and 2. The cover slide may now be removed by rotating the crank arm in the clockwise direction. The foremost film unit is now in position to be exposed and the elements of the camera are now in the position shown in FIG. 1 and adapted to expose the film unit and initiate processing of same in accordance with the description provided above.

Reference will now be made with regard to FIGS. 4 and 5 which are directed to another embodiment of the invention. In this embodiment a photographic apparatus 100, such as a camera, is provided which includes various elements to be described for exposure and initiation of processing of self-processing film units of the type referred to above. The apparatus includes an elongated shuttle 110 which is supported on the apparatus for pivotal and translational movement. The shuttle includes a film engaging member 102 which functions in a manner similar to that of the embodiment of FIG. 1. A gear rack 113 is also formed on the shuttle and like that of the embodiment of FIG. 1, it cooperates with a driven gear such as gear 104 to advance the shuttle from its retracted position towards an advanced position so that the film engaging member feeds a foremost film unit that is located within the apparatus into the nip between driven pressure rollers 105, 106. The pressure rollers and their associated drive means gears 105a, 106a operate similarly to that described with reference to the embodiment of FIG. 1.

The movement of the shuttle is also generally similar to that described with reference to the embodiment of FIG. 1, however, there are differences between the two embodiments in the means for providing this movement. The embodiment of FIG. 4 includes in addition to the aforementioned elements, the following elements:

1. a cartridge sensing lever 120
2. a shuttle latch lever 130
3. a shutter opening lever or a high energy lever 140
4. a latch 160 for the shutter opening lever 140
5. a body release member 150

The cartridge sensing lever includes an arm 122 having a rearwardly projecting shoe 123 which extends through an aperture 101 in the cartridge seating chamber of the camera so that the shoe is adapted to contact a forwardly facing wall of a film cartridge 170. The lever is pivotably supported to the frame of the camera about a pin 121 and biased by a spring 125 in the counterclockwise direction. A tab 124 on the lever cooperates with the shuttle latch lever 130 in a manner to be described below.

The shuttle latch lever 130 supports the shuttle in its advanced position prior to actuation of the body release. This lever includes a first tab 132 which cooperates with a tab 112b on the shuttle for restraining the shuttle in the advanced position against the bias of strong shuttle spring 118. The lever is supported for pivotal movement about a pin 131 and is biased lightly by a spring 135 favoring rotation in the clockwise direction. A second tab 139 located on the lever cooperates with tab 124 of the cartridge sensing lever. A third tab 138 located on a forwardly projecting arm 137 of the lever is adapted to be engaged by a rearwardly facing projection 151 formed on the body release member during depression of the body release by the operator. A fourth tab 134 is located on a second arm 133 of the shuttle latch lever. This tab is elongated and inclined as shown so as to cooperate with tab 112a of the shuttle during movement of the shuttle from its advanced position to its retracted position. A third arm 136 is cooperable with tab 112a on the shuttle for moving the shuttle out of engagement with the gear when no cartridge is located in the camera.

The shutter opening lever 140 is similar to the member of the same name described with reference to the embodiment of FIG. 1 and includes a first arm 141 that has at one end thereof a shoe 146 which is adapted to rest upon arm 162 of the latch 160 when the shutter is in a cocked condition. A second arm 141 of this lever cooperates with an arm 180 of a shutter opening blade. The lever is pivotably supported to the apparatus by a pin 143 and is biased by a coil spring 145 for rotation in a counterclockwise direction. Like the embodiment of FIG. 1, the lever is cocked during return movement of the body release member to its initial position by cooperation of a projection 154 on the body release and a third arm 144 of the shutter opening lever.

The latch 160 for the shutter opening lever is also similar to that described with reference to the embodiment of FIG. 1 and includes a first arm 163, that is slidably and pivotably coupled to a tab 115 on the shuttle, and second and third arms 162, 164 that engage with the shutter opening lever 140. The latch is pivotable about a pin 161.

The body release member 150 like that of the embodiment of FIG. 1, is slidably mounted on the camera and includes a portion which is exposed through an opening in the outer cover of the camera so that it is accessible to the operator of the camera for purposes of initiating an exposure of a film unit. Internally of the camera and at the rear of the body release member there are two projections. The first projection 151 is adapted to cooperate with tab 138 of the shuttle latch lever and the second projection 152 cooperates with an arm 114 formed on the shuttle.

Further description of the embodiment of FIGS. 4 and 5 will now be made in terms of the operation of the elements comprising this embodiment.

As shown in FIG. 5a, when the camera does not contain a cartridge the sensing lever 120, under the biasing influence of spring 125, holds shuttle latch lever 130 toward the back of the camera, against the biasing influence of spring 135, by the engagement of tab 124 with tab 139. Shuttle latch lever 130 holds shuttle 110 (now at its bottom-most position) out of contact with gear 104 by the engagement of arm 136 with tab 112a. This prevents the shuttle from being cranked upward, and thus prevents a flashbulb from being wasted should such be plugged into the camera's socket 190 and body release member 150 depressed. In this condition turning of crank 107 will only drive pressure roller 105, 106 and gears 104, 105a and 106a.

Inserting a cartridge into the camera (see FIG. 5b) causes the cartridge's front face 170a to engage shoe 123 of sensing lever 120 and thereby urges the sensing lever clockwise about pin 121 to its forwardmost position against the biasing influence of spring 125. This allows the shuttle latch lever 130 also to move clockwise about pin 131, under the biasing influence of spring 135, to its forwardmost position. In so moving, the lower end of tab 134 engages tab 112a and pushes vertical rack portion 113a of the shuttle into engagement with gear 104. Tab 117 at the lower end of the shuttle then rests against the front face of the cartridge, under the biasing influence of spring 119, and the shuttle's film engaging member or picker claw 102 is then in position to engage the trailing edge of the safety cover.

Figure 5C:
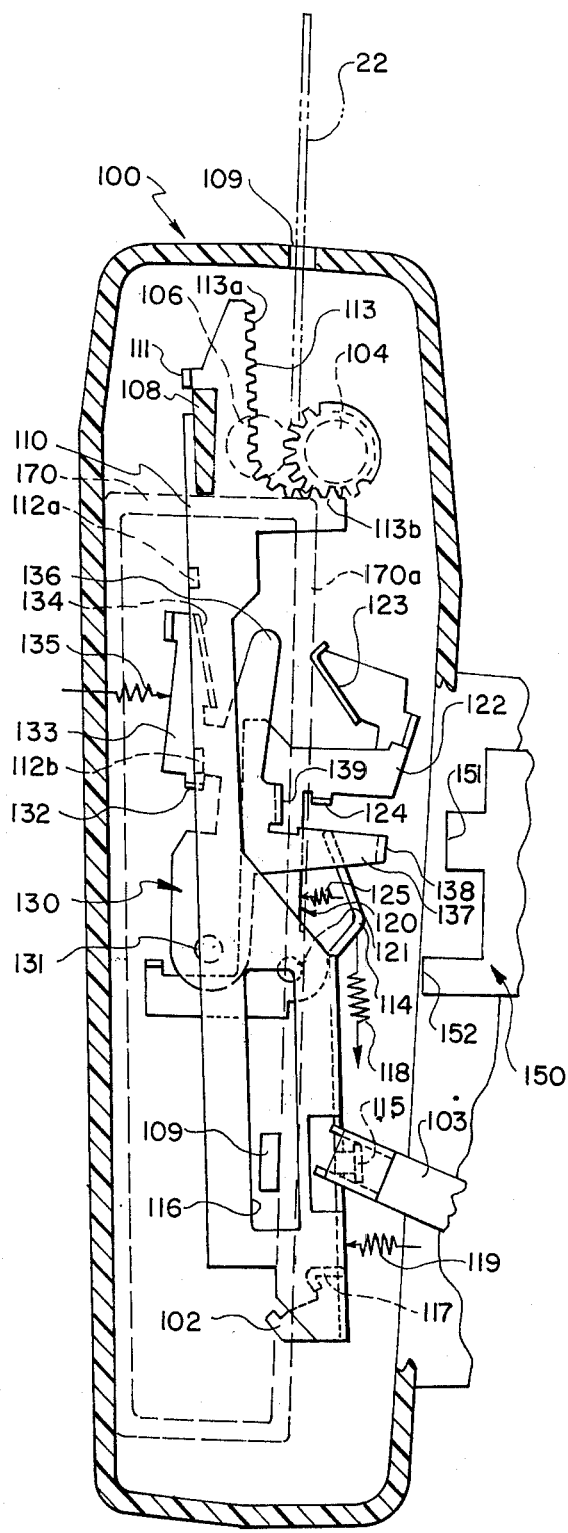
FIGS. 5a, b, c and d represent side elevational views of various operative positions of the mechanisms associated with the embodiment of FIG. 4.
Figure 5D:
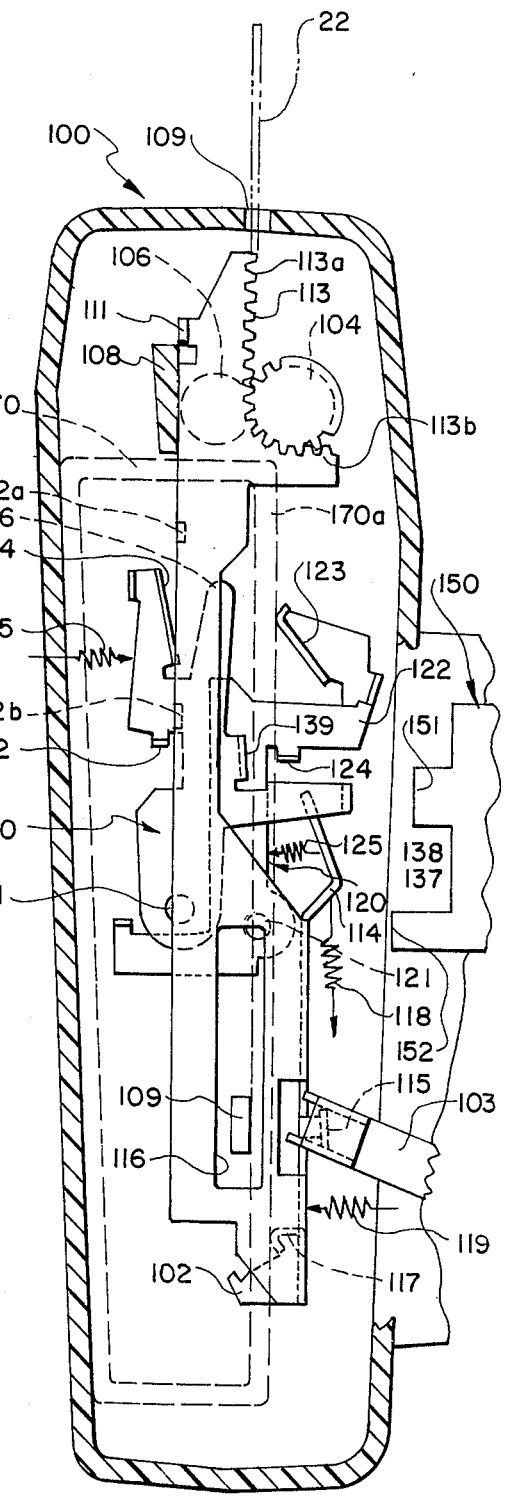

To operate the film-advance mechanism, crank 107 is turned clockwise to drive pressure rollers 105, 106 and gear 104. Since, as shown in FIG. 5b, the gear 104 is now meshed with vertical rack portion 113a, turning of the crank causes the shuttle to move upward, against the downward-biasing force of spring 118, and to thereby advance the engaged safety cover (or, in later cycles, a film unit) into the roller nip. As the operator continues to turn the crank after the shuttle has reached the top of its stroke (shown in FIG. 5d), horizontal rack portion 113b of the shuttle is driven by the gear 104 to move shuttle tab 111 rearward over the top of island 108 (see FIG. 5c) until tab 111 drops off the back edge of the island and down the back side thereof. The shuttle descends a short distance, under the influence of spring 118, until tab 112b thereon is stopped by tab 132 on the shuttle latch lever. The shuttle is now completely disengaged from gear 104, as tab 111 remains trapped behind island 108. As the crank continues to be turned, rollers 105, 106 advance the engaged safety cover (or, in subsequent cycles, a film unit) through the nip and out through the exit slot 109 of the camera body.

Description will now be made relative to making of an exposure on a foremost film unit. When release member 150 is moved rearwardly (to the left as viewed in the drawings), against the biasing influence of strong spring 153 and is near the end of its rearward stroke, projection 151 (see FIG. 5c) on release member 150 engages tab 138 on shuttle latch 130 and moves the shuttle latch counterclockwise (rearward) until tab 132 thereon leaves shuttle tab 112b, thereby releasing the shuttle to descend a short distance, under the influence of spring 118, so that the elbow of shuttle arm 114 engages projection 152 on the body release member. As the shuttle thus descends to that point, it rotates latch 160 counterclockwise, and thereby moves latch arm 162 out from under shoe 146 to release the shutter opening lever 140 for clockwise movement under the biasing force of spring 145 to thereby move arm 180 of the shutter opening blade to commence an exposure in accordance with the description of the operation of the shutter described for the embodiment of FIG. 1.

When the operator releases body release member 150 for return movement by strong spring 153 to its forwardmost position, its projection 152 moves out from holding engagment with shuttle arm 114, thereby allowing the shuttle to descend fully under the influence of spring 118. During its descent, as shuttle tab 111 slides down the back side of island 108, shuttle tab 112a moves against the forward-facing surface of shuttle latch tab 134 and thereby urges the shuttle latch 130 rearwardly (counterclockwise) against the influence of spring 135. When shuttle 110 reaches the bottom of its stroke, shuttle tab 111 clears the bottom edge of island 108, permitting the lower end of shuttle latch tab 134 to bear forwardly against shuttle tab 112a, under the influence of spring 135, and thereby push vertical rack portion 113a into engagement with gear 104, as shown in FIG. 5b.

Also during the return movement of body release member or button 150 a projection 154 thereon engages shutter opening lever arm 144 and moves this lever clockwise, againt the force of spring 145, to its initial, cocked position. During the cocking movement of this lever, downward-moving arm 142 leaves the opening blade arm 180 of the shutter, thereby allowing the opening blade and the closing blade to rotate counterclockwise to their initial positions as described with reference to the embodiment of FIG. 1. A flash firing mechanism similar to that described with reference to the embodiment may also used with the embodiment of FIG. 4.

Alternatively, a flash firing system such as that described in commonly assigned application Ser. No. 780,139, (now U.S. Pat. No. 4,070,685) filed concurrently herewith in the name of Graham Asker and entitled Firing Spring Cocking Mechanism may also be used.

During the final descent of the shuttle, latch 160 will be rotated counterclockwise enough so that its arm 164 will be positioned beneath shoe 146, blocking the shutter opening lever and thereby preventing another exposure until the picker is again cranked up to feed out the exposed film unit. Also, since the intial downward movement of the shuttle is what causes release of the shutter opening lever 140, it is impossible to pick and eject a film unit until after it has been exposed. The latter mentioned means for prevention of a double exposure of a film unit is the invention of Guilford E. Kindig and further description relative thereto may be found in commonly assigned application Ser. No. 780,151, filed concurrently herewith and entitled Double Exposure Prevention Mechanism.

Removal of the cartridge from the camera releases the cartridge sensing lever 120 for rearward (counterclockwise) movement by spring 125 causing tab 124 thereon to move against shuttle latch tab 139 and thereby push the shuttle latch 130 rearwardly so that shuttle latch tab 132 moves out from under shuttle tab 112b and releases the shuttle for downward movement by spring 118 to the bottom of its stroke. As before, the vertical rack portion 113a is prevented from engaging the gear 104 during the picker descent, first by the shuttle tab 111 bearing against the back side of island 108, and then by the picker tab 112 bearing against the rear edge of shuttle latch arm 136.

From the above description it will be appreciated that by providing for the release of the shuttle from its restraining means in response to the movement of the body release member from its initial position and for permitting the shuttle to translate to its retracted position in response to movement of the body release member back to its initial position a relatively simple means is provided for eliminating the vibrations and the shock created by having a shuttle completely drop from its advanced position to its retracted position during exposure of a foremost film unit. Furthermore, any disturbance which might tend to develop due to, for example, a partial drop of a shuttle to actuate a shutter may be minimized through the tendency of the disturbance to be damped by the engagement of the shuttle by the body release.

As indicated previously, the specific details of the shutter per se are not critical. In addition to the shutter described and those known in the prior art another shutter, which is useful is described in commonly assigned application Ser. No. 780,150, filed concurrently herewith in the name of Graham Asker and entitled Low Inertia Electronic Shutter.

The invention has been described in detail with particular reference to preferred embodiments thereof, but it will be understood that variations and modifications can be effected within the spirit and scope of the invention.

We claim:

1. Photographic apparatus for effecting exposure and initiating removal of a film unit from an exposure position in the apparatus, the apparatus comprising a shutter, a shuttle including film unit engaging means for at least partially removing the film unit from the exposure position, spring means coupled to the shuttle for biasing the shuttle for movement towards a first position in which position the film unit engaging means is located adjacent an edge of the film unit, means for moving the shuttle from the first position to at least partially remove the film unit from the exposure position, restraining means for preventing the return of the shuttle to the first position after movement of the shuttle from the first position and for supporting the shuttle in an inactive but energized condition in a second position under the bias of the spring means, body release means movable from and returnable to an initial rest position for initiating an exposure of a film unit and for removing the restraint upon the shuttle to permit the shuttle to translate towards the first position under the bias of said spring means, means responsive to translational movement of the shuttle from the second position towards the first position and operatively associated with the shutter for effecting commencement of the exposure of the film unit; and the improvement which comprises:

means for blocking the shuttle from returning to the first position after translational movement of the shuttle a sufficient distance from the second position to effect commencement of the exposure of the film unit, the sufficient distance being a minor portion of the distance between the second and first positions, and the blocking means being cooperable with the body release means to permit the shuttle to again translate towards the first position in response to movement of the body release means to its initial position.

2. The apparatus of claim 1 wherein the means for effecting commencement of the exposure of the film unit comprises a latching lever pivotably supported to the apparatus, the lever including means for engaging the shuttle and including a tripping arm operatively associated with the shutter whereby the latching lever will pivot in response to movement of the shuttle from the second position towards the first position and the shutter will open in response to movement of the tripping arm.

3. The apparatus of claim 2 wherein the means for effecting commencement of the exposure of the film unit further comprises a second lever pivotably supported to the apparatus, the second lever including means adapted to open the shutter for exposure of the film unit upon pivotable movement of the second lever in a predetermined first direction, second spring means for biasing the second lever for pivotable movement in the first direction for opening of the shutter, and the second lever further including an arm operatively associated with the tripping arm of the latching lever whereby the second lever is blocked by the tripping arm from pivotable movement in the first direction under the bias of the second spring means when the shuttle is retained by the restraining means and is permitted to pivot in the first direction in response to movement of the tripping arm.

4. The apparatus of claim 3 wherein the apparatus further includes a piezoelectric member for generating an electric potential in response to pressure applied thereto, a spring-like beam supported upon the apparatus and including a hammer for selectively impacting upon the piezoelectric member, and means for supporting the beam in a cocked condition and for selectively releasing the beam for impact of the hammer upon the piezoelectric member in response to pivoting movement of the second lever.

5. The apparatus of claim 4 wherein the means for supporting the beam includes a member that is integral with the second lever.

6. The apparatus of claim 5 wherein the apparatus includes means responsive to the movement of the body release means to its initial position for cocking the hammer and for supporting the beam in a cocked condition and responsive to movement of the body release means from its initial position for releasing the beam so that it may be supported by the second lever.

7. The apparatus of claim 1 wherein the means for blocking the shuttle comprises a blocking structure formed integral with the body release means and the shuttle includes means cooperable with the blocking structure to block the shuttle from movement towards the first position when the blocking structure is engaged with the shuttle and the body release is in a position removed from its initial position.

8. Photographic apparatus for effecting exposure and initiating removal of a self-processing film unit from an exposure position in the apparatus, the apparatus comprising means for controllably exposing the film unit, film unit transport means including a movable shuttle having film unit engaging means for at least partially removing the film unit from its exposure position in response to movement of the shuttle to an advanced position, spring means coupled to the shuttle for biasing the shuttle towards a retracted position wherein the film unit engaging means is disposed to engage the film unit in its exposure position, means for restraining the shuttle in the advanced position against the bias of the spring means, body release means movable from and returnable to an initial rest position for actuating the exposure means to initiate a controlled exposure of the film unit; and the improvement which comprises:

operative means responsive to movement of the body release means from its initial position for releasing the shuttle from the restraining means and for permitting the shuttle to translate towards its retracted position under the bias of the spring means, the operative means cooperating with the shuttle to halt the shuttle in an intermediate position and to prevent same from returning to its retracted position under the bias of the spring means while the body release means is maintained during exposure of the film unit in a position removed from its initial position, the intermediate position of the shuttle being spaced from the advanced position thereof a distance that is a minor portion of the distance between its advanced and retracted positions, and the operative means cooperating with the shuttle and the body release means to permit the shuttle to again translate towards its retracted position in response to movement of the body release means to its initial position.

9. The apparatus of claim 8 wherein the operative means is formed integral with the body release means.

* * * * *